United States Patent [19]
Larue et al.

[11] Patent Number: 5,891,380
[45] Date of Patent: Apr. 6, 1999

[54] TAMPER EVIDENT CAPS AND METHODS

[75] Inventors: Daniel L. Larue, Toledo; William A. Moll, IV, Holland; Francis M. Schloss, Perrysburg; Mortimer Stafford Thompson, Holland, all of Ohio

[73] Assignee: Zapata Innovative Closures, Inc., Coconut Grove, Fla.

[21] Appl. No.: 206,028

[22] Filed: Mar. 3, 1994

Related U.S. Application Data

[63] Continuation of Ser. No. 905,074, Jun. 24, 1992, abandoned, which is a continuation of Ser. No. 458,304, Dec. 28, 1989, abandoned.

[51] Int. Cl.$^6$ .................................................. B29C 59/00
[52] U.S. Cl. .................... 264/296; 264/291; 264/320; 264/323; 264/339; 264/340
[58] Field of Search .................. 264/323, 296, 264/320, 322, 339, 295, 291, 340

[56] References Cited

U.S. PATENT DOCUMENTS

| | | |
|---|---|---|
| 521,788 | 6/1894 | Flanigan . |
| 951,513 | 3/1910 | Love . |
| 1,770,548 | 7/1930 | Oven . |
| 2,043,226 | 6/1936 | Beider et al. . |
| 2,340,353 | 2/1944 | Weaver . |
| 2,423,295 | 7/1947 | Crabbe et al. . |
| 2,447,340 | 8/1948 | Jackson . |
| 2,456,560 | 12/1948 | Keith . |
| 2,852,054 | 9/1958 | Motley . |
| 2,885,510 | 5/1959 | Heyl et al. . |

(List continued on next page.)

FOREIGN PATENT DOCUMENTS

| | | |
|---|---|---|
| 764429 | 3/1971 | Belgium . |
| 0049876 | 10/1981 | European Pat. Off. . |
| 555488 | 3/1923 | France . |
| 2306135 | 4/1976 | France . |
| 2378689 | 1/1978 | France . |
| 1811318 | 7/1969 | Germany . |
| 2829753 | 1/1980 | Germany . |
| 3523771 | 1/1987 | Germany . |
| 351515 | 1/1961 | Switzerland . |
| 607702 | 8/1975 | Switzerland . |
| 788148 | 8/1956 | United Kingdom . |
| 930866 | 8/1956 | United Kingdom . |
| 1024762 | 10/1962 | United Kingdom . |
| 1048727 | 3/1965 | United Kingdom . |

OTHER PUBLICATIONS

Cryogenics (Jul. 1980)—M. Shinohara, T. Kugo, and K. Ono Superleak–Tight Stainless Steel Hollow O–Ring Seals for Cryogenic Use.

*Primary Examiner*—Merrick Dixon
*Attorney, Agent, or Firm*—Rogers & Wells LLP

[57] ABSTRACT

A tamper evident cap is provided which includes plastic and includes a skirt having means for engaging means on a neck of a container for closing and opening the container, and an annular frangible band connected to and depending from the skirt, wherein the band includes an outer wall frangibly connected to the skirt by a line of weakness comprising fracturable bridges, posts and the like, and an inner wall joined to the bottom of the outer wall by a curvilinear connecting portion and extending therefrom inwardly and upwardly in a generally inverted "J", "U", "V", triangulated curl " or "trapazoidal" cross-sectional shape, wherein the inner wall includes a free end comprising a rim adapted to engage the interfering means on a container. The rim of the inner wall also can include a sharply curvilinear configuration which provides a compressible and resilient interfering surface that nests tightly against the underside portion of a projecting bead or shoulder on the container neck to thereby provide significant interference upon initial removal of the cap. In the triangulated curl embodiment, the inner wall can include a projection extending outwardly from the rim. Further, the inner wall of the band can be bowed or have a concave shape to provide stability upon compression of the band during initial removal of the cap.

8 Claims, 3 Drawing Sheets

U.S. PATENT DOCUMENTS

| | | |
|---|---|---|
| 2,894,844 | 7/1959 | Shakman . |
| 2,961,119 | 11/1960 | Leach . |
| 3,038,624 | 6/1962 | Wieckmann . |
| 3,065,677 | 11/1962 | Loeser . |
| 3,171,453 | 3/1965 | Strong . |
| 3,200,981 | 8/1965 | Harding . |
| 3,235,452 | 2/1966 | Moloney et al. . |
| 3,243,851 | 4/1966 | Reitter, Jr. et al. ............................ 18/42 |
| 3,250,417 | 5/1966 | Powers, Jr. et al. . |
| 3,272,369 | 9/1966 | Grimsley . |
| 3,286,866 | 11/1966 | McIntosh . |
| 3,339,770 | 9/1967 | Weigand . |
| 3,343,700 | 9/1967 | Heubl . |
| 3,344,942 | 10/1967 | Hedgewick . |
| 3,348,717 | 10/1967 | Treanor . |
| 3,352,127 | 11/1967 | Skinner, Sr. . |
| 3,352,448 | 11/1967 | Livingstone . |
| 3,369,694 | 2/1968 | Mauser et al. . |
| 3,374,913 | 3/1968 | Zipper ........................................ 215/39 |
| 3,385,249 | 5/1968 | Czarnecki . |
| 3,402,873 | 9/1968 | Lauterbach, Jr. . |
| 3,405,439 | 10/1968 | Uemura . |
| 3,418,409 | 12/1968 | Hesse et al. . |
| 3,428,328 | 2/1969 | Shelby et al. . |
| 3,445,478 | 5/1969 | Fields et al. . |
| 3,460,703 | 8/1969 | Leftault et al. ............................ 215/40 |
| 3,460,708 | 8/1969 | Leftault, Jr. . |
| 3,482,725 | 12/1969 | Exton . |
| 3,524,568 | 8/1970 | Nughes . |
| 3,532,786 | 10/1970 | Coffman . |
| 3,543,963 | 12/1970 | Heisler . |
| 3,557,275 | 1/1971 | Longshaw et al. . |
| 3,557,985 | 1/1971 | Denis et al. . |
| 3,567,233 | 3/1971 | Stephanich . |
| 3,586,204 | 6/1971 | Roner . |
| 3,612,324 | 10/1971 | Malick . |
| 3,613,929 | 10/1971 | Treanor . |
| 3,676,543 | 7/1972 | Reinhold et al. . |
| 3,709,399 | 1/1973 | Nughes . |
| 3,784,041 | 1/1974 | Birch . |
| 3,820,799 | 6/1974 | Abbes et al. . |
| 3,847,540 | 11/1974 | Hidding . |
| 3,861,551 | 1/1975 | Hannon . |
| 3,977,153 | 8/1976 | Schrank . |
| 4,016,996 | 4/1977 | Aichinger et al. . |
| 4,069,937 | 1/1978 | Smalley . |
| 4,088,086 | 5/1978 | Miller . |
| 4,090,631 | 5/1978 | Grussen ........................................ 215/329 |
| 4,091,948 | 5/1978 | Northup . |
| 4,102,467 | 7/1978 | Woodley . |
| 4,141,463 | 2/1979 | Smith . |
| 4,143,785 | 3/1979 | Ferrell . |
| 4,153,172 | 5/1979 | Bialobrzeski . |
| 4,184,444 | 1/1980 | Woodley . |
| 4,196,818 | 4/1980 | Brownbill . |
| 4,197,955 | 4/1980 | Luenser . |
| 4,202,462 | 5/1980 | Imber . |
| 4,206,852 | 6/1980 | Dunn et al. . |
| 4,209,102 | 6/1980 | Dunn et al. . |
| 4,210,251 | 7/1980 | Grussen . |
| 4,218,067 | 8/1980 | Halling . |
| 4,253,581 | 3/1981 | Aichinger et al. . |
| 4,257,525 | 3/1981 | Thompson . |
| 4,274,544 | 6/1981 | Westfall . |
| 4,281,774 | 8/1981 | Mumford . |
| 4,281,979 | 8/1981 | Doherty et al. . |
| 4,290,614 | 9/1981 | Moll . |
| 4,333,584 | 6/1982 | Gall . |
| 4,343,408 | 8/1982 | Csaszar . |
| 4,345,692 | 8/1982 | Obrist et al. . |
| 4,360,114 | 11/1982 | Owens . |
| 4,360,149 | 11/1982 | Hein . |
| 4,378,894 | 4/1983 | Willis et al. . |
| 4,386,044 | 5/1983 | Arndt et al. . |
| 4,392,579 | 7/1983 | Uhlig et al. . |
| 4,394,918 | 7/1983 | Grussen ................................ 215/243 |
| 4,418,828 | 12/1983 | Wilde et al. ............................ 215/252 |
| 4,442,947 | 4/1984 | Banich, Sr. . |
| 4,470,513 | 9/1984 | Ostrowsky . |
| 4,475,274 | 10/1984 | Beckstrom et al. . |
| 4,484,964 | 11/1984 | Kawamata . |
| 4,497,765 | 2/1985 | Wilde et al. . |
| 4,503,985 | 3/1985 | Swartzbaugh et al. . |
| 4,505,401 | 3/1985 | Berglund . |
| 4,506,795 | 3/1985 | Herr ........................................ 215/252 |
| 4,519,516 | 5/1985 | Amos . |
| 4,524,876 | 6/1985 | Kusz . |
| 4,527,701 | 7/1985 | Schaubeck . |
| 4,527,704 | 7/1985 | Swartzbaugh . |
| 4,527,706 | 7/1985 | Swartzbaugh et al. . |
| 4,530,438 | 7/1985 | McDevitt . |
| 4,537,319 | 8/1985 | Whitney . |
| 4,540,099 | 9/1985 | Swartzbaugh et al. . |
| 4,549,667 | 10/1985 | Dullabaun . |
| 4,550,844 | 11/1985 | Lininger ................................ 215/252 |
| 4,552,279 | 11/1985 | Mueller et al. . |
| 4,561,555 | 12/1985 | Miller . |
| 4,563,325 | 1/1986 | Coffman . |
| 4,573,582 | 3/1986 | Kusz . |
| 4,573,598 | 3/1986 | Perry . |
| 4,573,599 | 3/1986 | Fillmore . |
| 4,573,601 | 3/1986 | Berglund . |
| 4,583,665 | 4/1986 | Barriac . |
| 4,595,547 | 6/1986 | Herr . |
| 4,613,052 | 9/1986 | Gregory et al. . |
| 4,625,875 | 12/1986 | Carr et al. . |
| 4,626,157 | 12/1986 | Franek et al. . |
| 4,626,158 | 12/1986 | Le Bret . |
| 4,645,087 | 2/1987 | Kusz . |
| 4,653,657 | 3/1987 | Papavasilopoulos . |
| 4,655,356 | 4/1987 | Fuchs . |
| 4,664,278 | 5/1987 | Barriac . |
| 4,667,384 | 5/1987 | Miller . |
| 4,692,132 | 9/1987 | Ikishima et al. . |
| 4,697,972 | 10/1987 | Le Bret . |
| 4,700,859 | 10/1987 | Gregory . |
| 4,700,860 | 10/1987 | Li . |
| 4,708,255 | 11/1987 | Thompson . |
| 4,709,824 | 12/1987 | Thompson ............................ 215/252 |
| 4,721,218 | 1/1988 | Gregory et al. . |
| 4,721,221 | 1/1988 | Barriac . |
| 4,730,745 | 3/1988 | Perry . |
| 4,749,094 | 6/1988 | Fuchs . |
| 4,749,095 | 6/1988 | Rote . |
| 4,751,036 | 6/1988 | Barriac . |
| 4,801,030 | 1/1989 | Barriac . |
| 4,801,031 | 1/1989 | Barriac . |
| 4,805,791 | 2/1989 | Begley . |
| 4,807,770 | 2/1989 | Barriac . |
| 4,846,361 | 7/1989 | Haffner . |
| 4,863,050 | 9/1989 | Perry . |

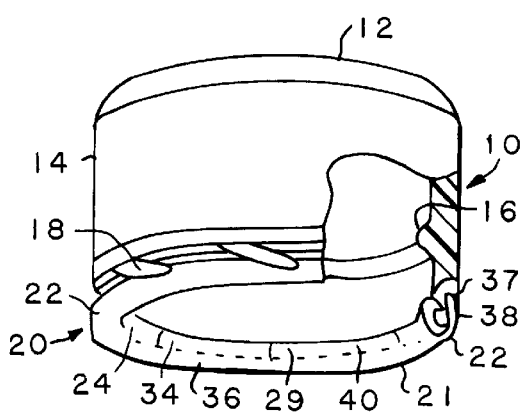
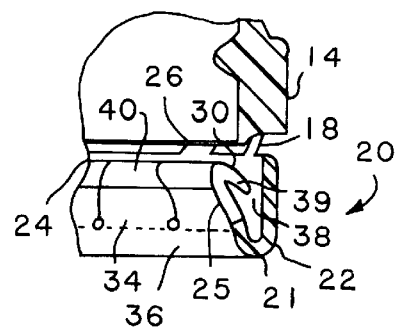
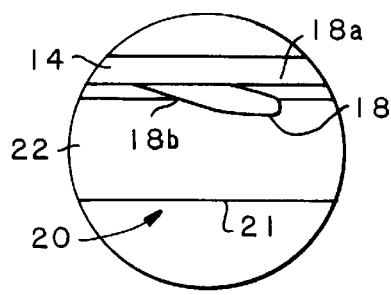
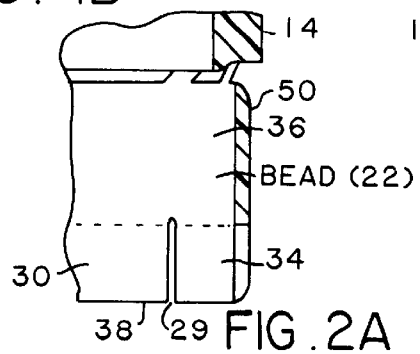
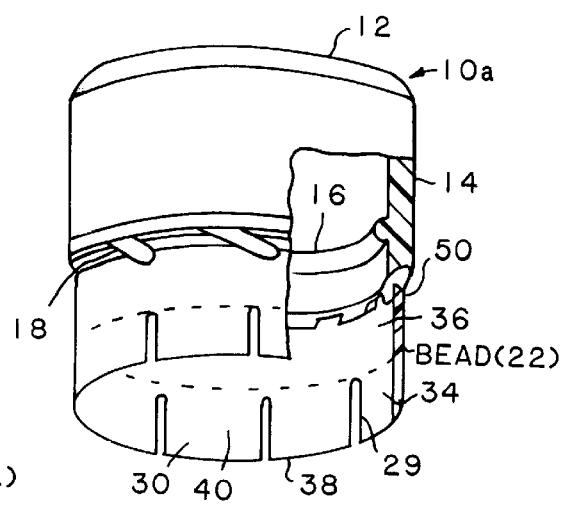
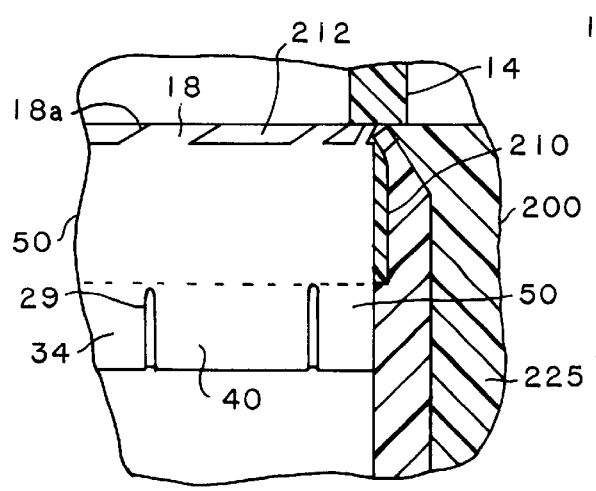
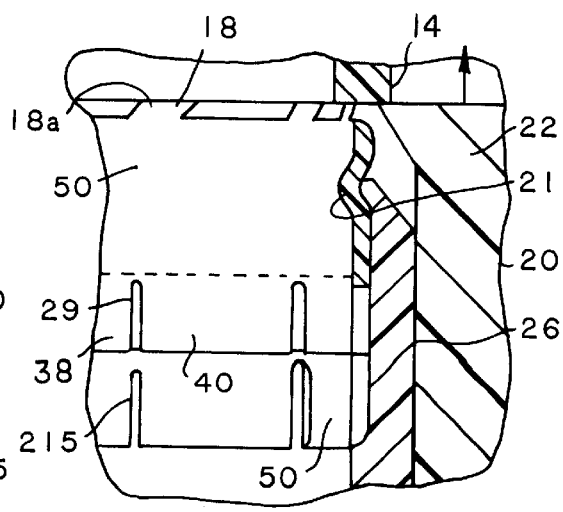

TAMPER EVIDENT CAPS AND METHODS

This application is a continuation of Ser. No. 07/905,074, filed Jun. 24, 1992, now abandoned, which is a continuation of Ser. No. 07/458,304, filed Dec. 28, 1989, now abandoned.

FIELD OF INVENTION

This invention relates to tamper evident caps for indicating the condition of containers, and particularly to caps having separable or breakaway portions to provide a clear and unequivocal indication of the condition of the containers, e.g., whether such containers have been opened or tampered with. More particularly, this invention relates to tamper evident caps which are easy to apply to containers without employing undesirable force and problems associated therewith such as misalignment, fracture and distortion, which are securely attached to a container, which are also difficult to tamper with by manipulation, and which clearly indicate the condition of the containers upon removal of the caps. This invention also relates to methods of forming the closures or caps of the invention.

BACKGROUND OF THE INVENTION

It is known to produce plastic tamper evident caps for containers which employ telltale breakaway rings which indicate the condition of the containers, i.e., whether such containers have been opened or tampered with. Commonly, such caps are molded of plastic materials and include a skirt having a ring or band that extends downwardly therefrom and is in a generally cylindrical or conical relationship to the skirt, and which is attached thereto by a line or area of weakness, including posts, bridges and the like. Typically, the skirt also includes engaging means for engaging a container for closing and opening the container and the band includes interfering means which engage the container to prevent removal of the band upon initial removal of the cap, thereby causing the band to break or separate from the skirt at the line of weakness, leaving the band as a telltale condition of the container.

For example, it is known to form a peripheral bead around the inside portion of a breakaway band, which bead is adapted to engage the underside of a bead or shoulder projecting from the periphery of a container neck. Thereafter, when the cap is initially removed from a container, the bead engages the underside of the projecting bead in an interfering manner, and the force to separate the band at the line of weakness becomes less than the interference force, whereupon the breakaway band separates leaving a tamper evident ring on the container. Such a design is shown, for example, in U.S. Pat. No. 4,527,704.

In another example, it is also known to fold at a portion of reduced thickness the lower portion of a breakaway band inwardly and upwardly to produce a continuous band which generally has a "V" cross sectional shape adapted to engage the underside of the bead or shoulder on the container neck. Thereafter, when the described cap is initially removed from a container, the free end of the inverted continuous "V" shaped portion of the band engages the underside of the projecting bead in an interfering manner, whereupon the breakaway band separates at the line of weakness, leaving the tamper-indicating band on the container.

While conceptually serving a useful purpose, such cap designs, in practice, do not always function in a reliable manner. For example, the design which employs an interfering peripheral bead on the lower portion of a breakaway band is rigid and difficult to apply to a container neck, and it can disadvantageously produce significant levels of interference with the upper surfaces of the container neck including the projecting bead upon capping. Such capping interference may require an undesirable excess of force to secure the cap on the container, possibly leading to the premature rupture of the line of weakness during the capping operation, or in cap misalignment and/or permanent deformation to structural features of the cap or container, or distortion of engaging beads, all of which may result in such a cap not being fully applied to the container neck or other nonsatisfactory performance. Further, once snapped in place, an interfering bead by virtue of a rounded configuration, only provides a limited surface for engagement, for example, with the outside peripheral horizontal underside surface of a container neck projecting bead. Such an engagement may be separated by relatively little force enabling the breakaway band and the entire cap to be removed intentionally from the container neck without rupturing the line of weakness, thereby defeating the purpose of the tamper indicating features.

The design which employs a continuous "V" shaped portion on the lower end of a breakaway band offers improvement over the peripheral bead design in providing significant levels of interference, for example, with the underside of an interfering container bead upon initial cap removal, thereby insuring the rupture of the line of weakness and that the breakaway portion remains on the container neck. Such breakaway band portions, however, also disadvantageously produce significant levels of interference with the upper surface of the container neck finish and projecting bead upon capping leading to problems such as discussed above.

Attempts to solve these problems have included the formation of a cap with a lower breakaway ring having interfering means which include upwardly and inwardly folded independent tabs which lock against a projecting bead or annular shoulder on a container neck to retain the tamper-indicating breakaway ring on the neck when the cap is initially removed from the container. Tabs of this type of tamper-indicating means are independent of one another and are connected at their folds to the bands of the cap. An example of such a design is described in U.S. Pat. No. 4,506,795. While this design facilitates ease of cap application and alignment, such independent interfering tabs, however, can quite easily be manipulated to maneuver the folded tabs over the projecting bead on a container neck to remove the breakaway ring portion and the entire cap, thus defeating the purpose of the tamper-indicating feature.

Other existing considerations and problems relate to the production of tamper evident caps. For example, it is desirable that the circumferentially continuous band portions of a breakaway ring be made thin so that they are easily removed from a mold after their fabrication, and are sufficiently flexible to permit the easy application of a cap to a container neck. On the other hand, it is desirable to employ a breakaway band of strength and rigidity to inhibit manipulation while providing the requisite interference upon initial removal of the cap.

The previously described caps, including a band with a molded solid bead or the like, do not meet these objectives. The bead increases the axial force needed to axially strip the cap from the mold, thereby subjecting the bridges, posts or the like to axial forces which could cause premature fracturing, even before the cap is removed from the mold.

While existing caps, which include post forming techniques, may overcome mold stripping problems, these caps are beset by a number of other problems. As already described, the problems include difficulties in capping or in ease of undesirable manipulation of the caps.

Also, the means which provide the line of weakness between the skirt of the cap and the breakaway or separable band must be capable of being stripped from the mold. For example, presently available caps provide fracturable bridges or posts between the cap skirt and band at angles which, typically, are vertical or in some case at an angle of up to about 45° from the vertical. As an angle from the vertical the bridges can offer significant interference to removal from a mold by stripping and, because of their intended fragile nature, they are therefore typically produced in side acting movable mold sections so that the cap may be removed from the mold intact including its bridges and depending band. Such separately acting mold sections are more susceptible to wear which can affect the sharpness of the notch created by the bridge and the bottom of the skirt, thereby reducing notch sensitivity and tamper evident performance of the cap. U.S. Pat. Nos. 4,573,601 and 4,505,401 are illustrative of patents which describe frangible bridges which are at about 45° to the horizontal. At such angles, however, substantial axial forces and longer cap and container engagement may be required to fracture the bridges upon initial removal of the cap especially as tool wear affects the notch sensitivity at the bridge attachment sites. As a consequence, additional height and thread length may be needed for the cap and container, resulting in increased costs in material and manufacture. The approximately 45° angle may not provide sufficient "notch sensitivity," i.e. minimial axial forces at the attachment sites to the cap skirt and breakaway band for readily breaking the bridges upon initial removal of the cap from the container. In addition, bridges, posts and the like commonly are made relatively thin in an attempt to minimize the axial forces needed for fracturing upon initial removal of the cap. However, in manufacture, packaging, handling and capping the caps are subjected to radial forces which can prematurely fracture the thin bridges or posts, rendering the cap useless for their intended purpose.

Thus, there is a need for tamper evident caps and methods of forming the caps which overcome deficiencies in existing caps and methods.

SUMMARY OF THE INVENTION

In accordance with the present invention, there is provided a new and unique tamper evident cap for a container, having a lower breakaway or separable ring portion and a method for producing such ring portion, wherein the cap has ease of application without unnecessary force and associated problems, is extremely difficult to manipulate to defeat its tamper evident features, and readily breaks to leave the ring on the container upon initial removal of the cap to provide a clear indication of the condition of the container, and wherein the cap can be readily manufactured by strip molding techniques.

Generally, the tamper evident cap of the present invention comprises plastic and includes a skirt having means for engaging means on a neck of a container for closing and opening the container, and an annular frangible band connected to and depending from the skirt, wherein the band includes an outer wall frangibly connected to the skirt by a line of weakness comprising fracturable bridges, posts and the like, and an inner wall joined to the bottom of the outer wall by a curvilinear connecting portion and extending therefrom inwardly and upwardly in a generally inverted "J", "U", "V", "triangulated curl" or "trapazoidal" cross-sectional shape, wherein the inner wall includes a free end comprising a rim adapted to engage the interfering means on a container. The rim of the inner wall also can include a sharply curvilinear configuration which provides a compressible and resilient interfering surface that nests tightly against the underside portion of a projecting bead or shoulder on the container neck to thereby provide significant interference upon initial removal of the cap. In the triangulated curl embodiment, the inner wall can include a projection extending outwardly from the rim. Further, the inner wall of the band can be bowed or have a concave shape to provide stability upon compression of the band during initial removal of the cap.

The curvilinear connecting portion displaces the bottom of the inner wall from the bottom of the outer wall so as to provide a more vertical inner wall, thus creating a stronger band by reducing the radially directed forces acting on the bottom of the outer wall which serve to stretch it thereby facilitating reinversion of the inner wall before bridge breakage and ring separation can be accomplished.

In a preferred embodiment of the invention, the inner wall of the band includes one or more slots to create individual peripheral segments to facilitate capping while continuing to inhibit undesirable manipulation and to provide the requisite interference with the container upon initial removal of the cap.

In one embodiment the segmented inner wall includes a discontinuous portion at its free end with at least one separation in the form of a slit, slot or other separating configuration, and an annular continuous portion intermediate the free end and the connecting portion of the band. Illustratively, the inner wall can include a plurality of tabs separated or spaced about by slits or slots and the like, and a continuous portion adjacent to the tabs which provides the required stability and support.

In another embodiment, the segmentation of the inner wall of the breakaway band is provided by slits which extend from the free end of the inner wall at least to the connecting portion of the band, wherein support and stability for the tabs is provided by their contiguous abutting relationship.

In a further embodiment, the outer wall of the breakaway band is connected to the skirt by one or more fracturable bridges, wherein said bridges are in substantial circumferential alignment with the plane of the skirt and outer wall of the band, and whereby the upper and lower attachment sites of the bridges are at an acute angle of less than about 45°, and preferably about 15° or less to the horizontal. This bridge configuration, surprisingly, has been found to be readily ruptured upon the development of relatively low deformation during the initial removal of the cap, thereby providing a high level of tension at the described acute angles and tendency to tear across its profile upon initial cap removal. In other words, the bridges have a "notch sensitivity" not believed to be heretofore practically possible. Further, molded caps, including the acutely angled bridges and their depending bands, surprisingly can be stripped from the molds without fracturing the bridges and the bridges can be manufactured in substantially larger cross sections to reduce the risk of premature breakage during commercial handling and packaging and upon compressive forces imposed thereon during capping, thereby providing an exceedingly rugged tamper evident cap with improved/frangible features and performance.

In the method of the invention, a plastic cap is formed by molding the cap with a skirt and a depending breakaway band including an upper section frangibly connected to the skirt by a line of weakness, a lower section including a free end, and an intermediate portion joining the upper and lower sections of the band. The preform of the molded cap is then removed from the mold and the breakaway band is formed so that the upper section of the band becomes its outer wall, the lower section of the band becomes its inner wall including the free end, and the intermediate portion of the band becomes its curvilinear connecting portion at the bottom of and joining the walls. The band of the invention can be post formed to provide a generally "J", "U", "V", or "triangulated curl" or "trapazoidal" cross-sectional shape. In the triangulated curl embodiment, the free end of the inner wall may be formed to include a projection extending outwardly toward the outer wall of the band.

In each embodiment the inner wall can be curved to provide a concave configuration and the free end can be curled to provide a compressible and resilient surface.

In one embodiment, the plastic band is post formed by engaging the free end with a forming tool and moving the cap and/or tool toward each other, wherein the tool turns the engaged free end inwardly and then upwardly along the working surface of the tool, whereupon the free end of the inner wall being formed is restrained, such as by the lower surface of the skirt. Thereafter, continued relative movement of the cap and/or tool toward each other causes compression of the restrained inner wall and triangulation of the band. In triangulating the inner wall, it can be compressed to provide the concave inner wall of the band.

In the method of the invention, the previously described bridges are formed during molding and the cap is removed from the mold by stripping without damaging the acutely angled bridges. In addition, the segments in the inner wall of the band can be formed in the molding step or after removal of the cap from the mold.

These and other features of the present invention will be more fully understood in connection with the following detailed description of preferred embodiments and the accompanying drawings. It is to be understood that the invention is capable of modification and variation apparent to those persons skilled in the art within the spirit and scope of the invention, and that it is not intended to limit the invention in any way to such embodiments.

BRIEF DESCRIPTION OF THE DRAWINGS

The following is a detailed description together with accompanying drawings of preferred illustrative embodiments of the invention.

FIG. 1 is a bottom perspective view of one embodiment of a tamper evident cap of the present invention, partially broken away to show the details thereof including a breakaway band portion attached by frangible bridges and having a triangulated curled free end adapted for interfering engagement.

FIG. 1a and 1b are detailed perspective views of the tamper evident features of the cap in FIG. 1, showing the triangulated curled free end and frangible bridges, respectively.

FIG. 2 is a bottom perspective view of a preform of the cap of FIG. 1 after molding and which at this stage includes a breakaway band attached to the cap by frangible bridges, and having a lower preform portion for forming the triangulated curl.

FIG. 2a is a detailed perspective view of a preform of the triangulated curl and frangible bridges shown in FIGS. 1, 1a and 1b.

FIGS. 3a and 3b are detailed perspective views of a manufacturing method for the preform cap of FIG. 2 shown in partial cutaway to illustrate the details thereof, including the preform breakaway band and frangible bridges.

DETAILED DESCRIPTION OF PREFERRED EMBODIMENTS OF THE INVENTION

Figure 4:
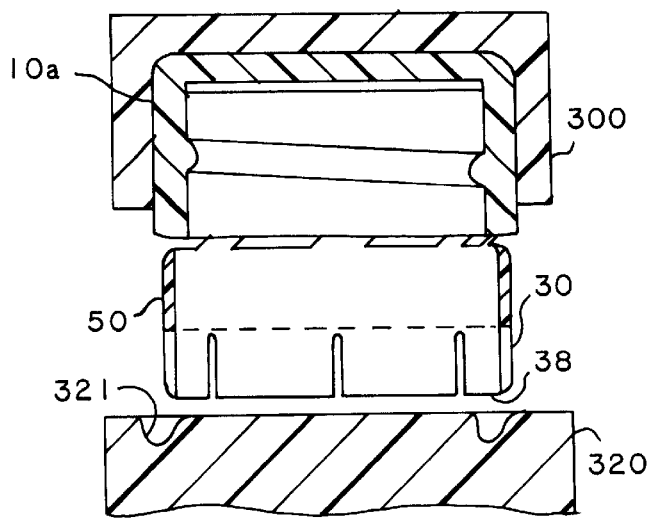
FIG. 4 is a longitudinal sectional view of the preform cap shown in FIG. 2 about to be engaged by a reforming tool of the invention.

Referring now to FIGS. 1 and 1a, there is shown a preferred embodiment of a cap 10 of the invention having a lid or top wall 12, an annular depending skirt 14 integrally joined to the top wall 12 about the periphery of the top wall, and having threads 16 about its inside surface for engaging cooperating external threads on a container neck finish to secure the cap to a container neck. The cap 10 also contains a peripheral line of weakness comprising a plurality of circumferentially spaced apart frangible bridges 18 connecting the depending skirt 14 to a lower breakaway ring 20. The illustrated breakaway ring 20 includes an outer annular wall section 22, preferably located in substantially vertical alignment with the depending skirt 14, and integrally connected at its upper end to the frangible bridges 18, and also includes an annular inner wall section 24 which extends radially inwardly and upwardly in a generally "J", "U" or "V" shape from the bottom portion of outer wall section 22 at a curvilinear connecting portion 21 which connects the outer wall section 22 at its lower end to the inner section 24, wherein the inner wall section 24 further preferably includes a free end 30 comprising a curvilinear rim portion 26 having a projection 37 with lip 38 extending outwardly from the rim 26 toward the outer wall section 22, and which curvilinear rim portion 26 is adapted to engage interfering means on a container, for example, a projecting ring, upon compression of the inner wall section 24. The inner wall section 24 further preferably includes an inner concave surface 25. Thus, the breakaway ring 20 forms a generally triangulated curl configuration having curvilinear portions at the angles defining its hypotenuse. As shown, the rim portion 26 of the free end 30 by virtue of its sharply curvilinear configuration and the concave surface 25 of the inner wall section 24 provide a resilient interfering surface which can nest tightly against the underside transition portion of a container neck projecting bead where it intersects with a container wall to provide significant interference upon removal of the cap.

The curvilinear connecting portion 21 displaces the bottom of the inner wall 24 from the bottom of the outer wall 22 so as to provide a more vertical inner wall 24 which creates a stronger band configuration by reducing the radially directed forces acting on the bottom of the outer wall 22 which serve to stretch it thereby facilitating reinversion of the inner wall 24 before breakage of bridges 18 and separation of ring 20 can be accomplished. Since it is not required that it bend or fold the curvilinear connecting portion 21 may be about the same thickness as other band portions and thereby more readily resist bending moments which could serve to diminish the advantage of the more vertically disposed inner wall 24.

The inner wall section 24 further comprises a peripherally discontinuous end portion 34 including the free end 30 comprising a plurality of spaced apart vertical slits 29 and a peripherally continuous intermediate portion 36 adjacent the peripherally discontinuous end portion 34 (as shown by dotted line) and the curvilinear connecting portion 21. Thus, as shown in FIG. 1 and 1a, the discontinuous end portion 34 of the inner wall section 24 comprises a plurality of independently flexible segmented tabs 40 bounded by vertical slits 29, the lip 38 of the outwardly extending projection 37, and the upper area of the peripherally continuous intermediate section 36 (as shown by dotted line).

It is further contemplated in the present invention that the peripherally discontinuous end portion 34 comprise at least one separation in the form of a slot, castellation, undulation or other separating configuration.

FIG. 1b shows in detail a preferred embodiment of frangible bridges 18 for use in the cap of FIG. 1 in the present invention. As shown in FIG. 1b, the outer wall 22 of breakaway band 20 is connected to the skirt 14 by a plurality of spaced apart frangible bridges 18 wherein the bridges 18 depend substantially circumferentially from skirt 14. As further shown, the upper and lower attachment sites of the bridges 18, illustrated in the drawing as 18a and 18b, respectively, are positioned to form an acute angle of about 15° from the lower horizontal plane of the skirt 14 and the upper horizontal plane of the outer wall 22 of the breakaway ring 20. Such a bridge configuration which is described in detail in commonly assigned U.S. patent application Ser. No. 07/458,305, filed Dec. 28, 1989, and incorporated herein by reference, is easily ruptured upon the application of relatively little removal torque translated thereto by engagement of the rim portion 26 of the inner wall section 24 in an interfering manner with a container neck. Upon the application of removal torque, a high level of tension (stretching) is developed at the acute angles formed at attachment sites 18a and 18b at low displacement thereof, thereby providing a tendency to tear across the bridge's 18 horizontal profile in the area of the attachment sites 18a and 18b, and thus reducing axial displacement at the rupture site and cap rotation to achieve separation. Such acutely angled bridge portions 18, which are readily susceptible to minimal removal torque and cap rotation, can be manufactured in a substantially larger cross section to provide an exceedingly rugged tamper evident feature, easily manufactured in one piece with the cap, and applied to a container with minimal risk of deformation or premature breakage. In addition to such frangible bridges discussed above, the present invention contemplates the use of any conventional frangible bridges which are suitable for use herein.

FIGS. 2 and 2a show the preform cap 10a of FIG. 1 as molded and prior to formation of the breakaway ring 20 in the form of the triangulated curl described above. As shown in the preform cap 10a, there is formed a configuration which includes a top wall 12, an annular depending skirt 14 with inner threads 16, and a lower annular breakaway band 50 having a cylindrical configuration, with a lower free end 30 with lip 38, and attached at its upper end by way of several frangible bridges 18, preferably of the type described hereinabove. As further shown in FIGS. 2 and 2a, the lower band 50 is preferably of reduced cross sectional area from that of the annular skirt 14.

In this preferred embodiment, the band 50 further comprises a peripherally discontinuous section 34 including the free end 30, and a peripherally continuous intermediate portion 36 which is adjacent to the peripherally discontinuous section 34 on its lower end and adjacent to the frangible bridges 18 on its upper end. As also shown, the peripherally discontinuous section 34 of band 50 comprises a plurality of vertical slits or slots 29 which extend from the lip 38 of lower free end 30 to the lower portion of the peripherally continuous intermediate section 36, but not thereinto (as shown by the dotted line), thus forming a plurality of tabs 40 each bounded by the vertical slits 29, the lip 38 of free end 30, and the lower portion of the peripherally continuous intermediate section 36.

The preform cap 10a in the present invention, such as illustrated in FIG. 2, can be molded by any suitable known process, such as by injection or compression molding, with any variety of suitable plastic materials, for example, polypropylene, polyethylene, and the like. In one embodiment of such methods, the preform band can be molded with a peripherally discontinuous portion in band 50, comprising at least one separation in the form of a slot or other separating configuration as described above.

Referring now to a preferred method of forming preform cap 10a in FIGS. 3a and 3b, the preform cap 10a having frangible bridges 18 and band 50 can be formed in one piece by a conventional injection molding operation employing a stripping mold wherein all portions of the cap 10a can be removed from the mold by stripping. FIGS. 3a and 3b show a mold female portion 210 of a multicomponent mold 200 which forms the outer, upper and lower surfaces of bridges 18 and band 50 and a mold stripper portion 225 capable of relative axial movement, after other mold components which form their inner surfaces have been removed. FIG. 3a shows a portion of the molded preform 10a including a portion of the band 50 with slots 29, the skirt 14 and bridges 18 connecting the skirt and band, as molded and still encased at their upper, lower and outer surfaces by female mold section 210. Female mold section 210 includes projecting elements 215 which form the slots 29 in band 50, therein forming the discontinuous section 34 as shown by the dotted line. FIG. 3b illustrates the relative movement of stripper portion 225 which bears on the lower surface 14a of skirt 14 to exert an axial pull on the bridges 18 and therethrough on the band 50 to strip them from the molding surfaces of mold female portion 210. For the pull exerted by the skirt 14 to strip the band 50 from mold portion 210, the band must be compressed circumferentially as it slides over the upper surfaces 212 of mold portion 210, which also form the bridges 18. Surprisingly, there can be enough shrinkage of the skirt 14 and the band 50 prior to stripping, and mechanical strength in the bridges 18, that the bridges maintain their integrity in spite of the severe undercuts resulting from bridge angles close to normal to the axis of stripping and in spite of the large undercut resulting from forming the thickness dimension of band 50. Additionally, to achieve such results the bridge must be designed to provide high strength during mold ejection to resist axial displacement which triggers the notch sensitivity of the acute bridge angle while the final breakaway ring conformation must provide enough greater strength and integrity as it is applied to a bottle neck that axial displacement of the bridge is thereupon readily achieved to fully employ the notch sensitive bridge construction. The net result is a lower axial displacement required to effect bridge breakage and thereby a lesser thread travel which in turn lowers skirt height requirements and thereby cap cost.

If desired, however, the segmenting of band 50 into tabs 40 can be accomplished in a post molding process by any conventional method suitable in the present invention, for example, by employing a knife-edged tool to make one of more cuts to a desired degree through the cross section of a designated peripherally discontinuous portion of a preform cap molded without a discontinuous portion. The band 50 may be cut through sufficient vertical length of a preform band 50 to produce a cap 10 which does not have a peripherally continuous intermediate portion 36. Such a method is described in detail, for example, in commonly assigned U.S. application Ser. No. 07/458,148, filed Dec. 28, 1989, and incorporated herein by reference.

Figure 5:
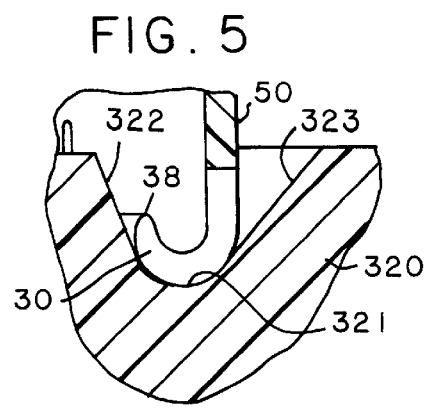
FIGS. 5–7 are detailed longitudinal sectional views of a portion of the cap in FIG. 4 illustrating the engagement and subsequent reforming of the cap by the reforming tool.
Figure 6:
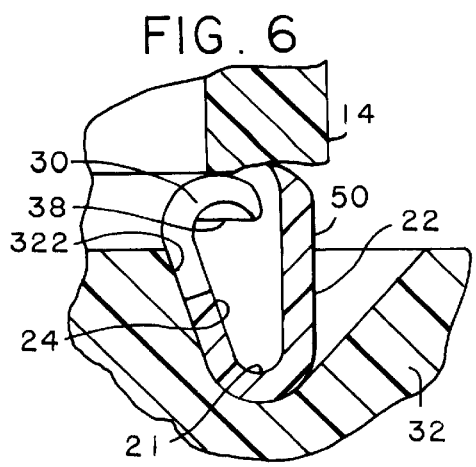
Figure 7:
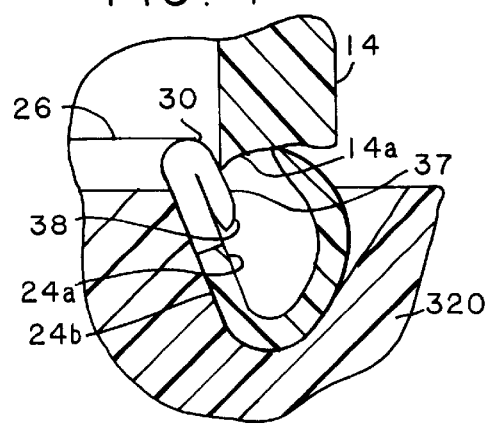

Referring now to FIGS. 4–7, there is shown a preferred method of reforming the breakaway band 50 by tools of the invention into the complete in ring 20, shown in FIG. 1, and which defines the inner and outer wall sections 24 and 22 respectively, joined at a curvilinear connecting portion 21 to form the triangulated curl of the invention. In particular, FIG. 4 shows the preform cap 10a of FIG. 2, illustrated in schematic cross section, and restrained in a holder means 300 to position and center the band 50 of the preform cap 10a above reforming tool 320, which is shown ready to engage the lip 38 of the band 50. The tool 320, which is suitable for shaping and dimensioning and otherwise reforming the free end 30 of the preform cap 10a into the triangulated curl of the invention, includes as its working surfaces a curvilinear entry portion 321 having a substantially concave cross-sectional surface and a first inclined surface 322 inwardly adjacent to the curvilinear entry portion 321 which serves as a ramped exit surface. The tool 320 also preferably includes a second inclined surface 323 outwardly adjacent to the curvilinear entry portion 321, and facing opposite the first inclined surface 322, which facilitates guiding and centering the lip 38 of free end 30 into the lowest point of the concave surface area of entry portion 321. The reforming operation is preferably accomplished by simultaneously engaging the entire lip 38 of free end 30 with the curvilinear surface 321 of reforming tool 320. As shown in detail in FIG. 5, the lip 38 now engaged with surface 321 is compressed and turned inwardly and then upwardly wherein the tool channels and gradually alters the direction of the movement of the lip 38 over its curved working surfaces. Such a curling action at this point produces an inwardly directed generally "U" or "J" curvilinear shape in the free end 30 of band 50. As is further shown in FIG. 6, the now transitionally formed curvilinear free end 30 is channeled upwardly along inclined surface 322 upon continued compression of the tool 320 on band 50 to produce a generally oval shape therein forming the outer wall section 22 and the inner wall section 24 which are connected at their respective lower ends by curvilinear connecting portion 21 formed from the working surfaces of the tool 320 in the manner aforesaid. As shown in FIG. 7, upon further compression of the cylindrical preform 50, the free end 30 is forced into contact with a lower horizontal surface 14a of the skirt 14, which serves to compress and form the tightly radiused curvilinear rim 26 and the inwardly extending projection 37 of rim 26 and force the extending projection 37 downwardly and back against the outer surface 24a of the now formed inner wall section 24 to form an inverted generally "V" shape of the free end 30 and inner section 24, and to produce a breakaway ring 20 in the form of a generally triangulated curl, having roughly the shape of an inverted right triangle with curvilinear ends defining the angles on either end of the hypotenuse.

As shown in FIG. 7, there is manifested a tendency for the formed inner wall section 24 to bow outwardly therein producing an inwardly concave inner wall section 24. As also shown in the sequence of FIGS. 5–7 the outer and inner walls 24 and 22, respectively, are now joined at annular curvilinear connecting portion point 21 having a semicircular radial cross section formed from the curved working surface 321 of the tool 320 at a portion of band 50 upon the conclusion of its compression by tool 320. The amount of curvature in inner wall section 24 can be adjusted by the configuration of inclined surface 22. Additionally, as shown in FIGS. 5–7, in a preferred embodiment of the invention, the peripherally discontinuous section 34 of the preform band 50 is positioned on the band 50 such that upon reforming in the manner described above, the curvilinear connecting portion 21 is developed in the peripherally continuous portion adjacent intermediate portion 36 of the band 50. It is further contemplated in this invention to produce a triangulated curl configuration having peripherally continuous outer and inner wall sections. After formation, the tool 320 is withdrawn, and the formed cap 10 is now ready for capping.

It is also contemplated in this invention that the reforming operation described above be completed using a separate tool to provide compressive interference in the manner provided by under surface 14a of skirt 14 on the free end 30 to produce rim 26 and the downward projection 37.

To facilitate the reforming operation of the present invention, for example, in the employ of plastic materials of construction such as polypropylene, the tool 320 can be heated to a temperature of from about 150° F. to about 300° F. for a reforming stroke of about 1 to 4 seconds.

Typical dimensions of the triangulated curl of the breakaway ring section 20 in a 28 mm diameter polypropylene cap are about 0.150 inches for the length of outer section 22 and having a thickness of about 0.018 to about 0.025 inches, and for the length of the inner section being about 0.100 to about 0.125 inches, and having a thickness of about 0.014 to about 0.020 inches, with a radial cross sectional distance from the point most distal on the rim 31 to the inner surface 22a of the outer wall 22 ranging from about 1.000 to about 1.050 inches, therein forming an angle defined at the curvilinear annular connecting portion 21 ranging from about 20° to about 30°. The above dimensions are, however, subject to wide variations depending upon the materials of construction and the contemplated end uses of the tamper evident caps of the invention.

Figure 8:
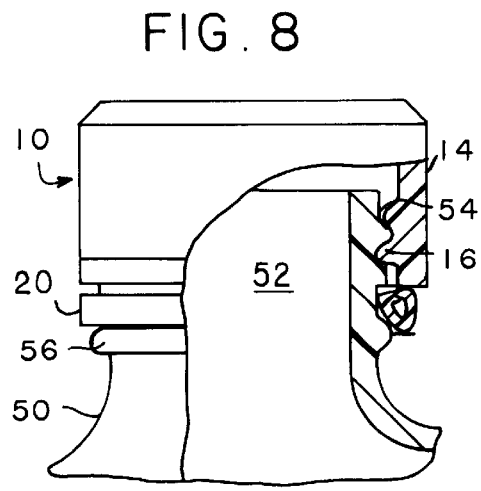
FIG. 8 is a longitudinal sectional view of the cap of FIG. 1 shown in partial cutaway and in partial engagement with a container neck.

Referring now to FIGS. 8–12, there is illustrated the use of the breakaway tamper evident features of the cap 10 shown in FIG. 1. FIG. 8 shows a cap 10 as partially threaded onto a bottle neck 52 of bottle 50 (partially shown), having an upper external thread 54 in cooperative interference engagement with the threads 16 on the inside surface of depending skirt 14, and wherein bottleneck 52 further includes a lower locking ring 56, as shown in detail in FIG. 9, which has a ramped outwardly and downwardly sloping outer surface 56a and an essentially flat horizontal under surface 56b. As shown in FIG. 8 and the detail of FIGS. 9, 10 and 11, as cap 10 is threaded onto the bottle neck 52 the peripherally discontinuous section 34 of the inner section 24 of the triangulated curl of breakaway ring 20, which defines a smaller circumference at its end most distal from annular connecting portion 21 than the lower locking ring 56 on bottle neck 52, easily slides over the downwardly and outwardly sloping surface of the threads 54 and locking ring 56, without unnecessary stress being imparted to deformable areas, such as the frangible bridges 18 and the triangulated curl on the breakaway ring 20, and the possibility of damage thereto as the tabs 40 readily flex past large diameter variations and tolerances on the bottle neck finish 52. The flexible tabs 40 which extend radially inwardly and upwardly and have their roots attached to the peripherally continuous intermediate section 36 are urged against the finish of the threaded bottle neck 52 where they are flexed outwardly towards outer section 22 at curved ends or joints, for example, where they meet the bottle neck threads 54 and upon encountering the downwardly sloping surface 56a of the locking ring 56. As can be seen, the flexible tabs 40 can assist in guiding the cap 10 as it is threaded and lowered onto the container neck 52 for installation, as the tabs 40 can serve as a cam guiding surface for the outer periphery of the cap 10 at the lower edge of connecting portion 21 to center and guide the cap 10 onto the bottle neck finish 52. When the container or bottle 50 is not properly axially aligned with cap 10, the flexible tabs 40 can be readily bent to achieve proper axial alignment, thus enabling the cap 10 to perform reliably without requiring exacting tolerances to be maintained on bottle necks, cap and capping equipment.

Figure 9:
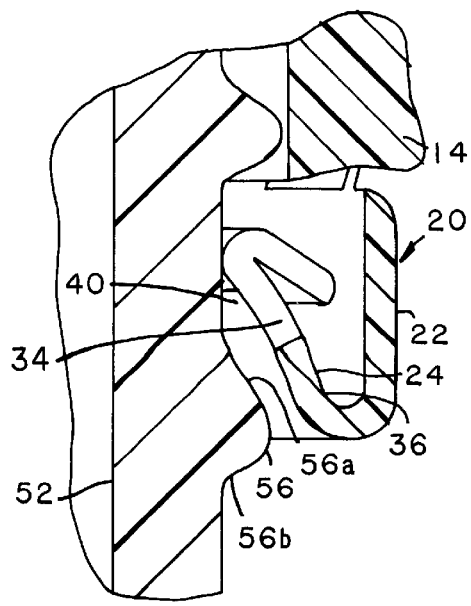
FIGS. 9–11 are detailed longitudinal sectional views of a portion of the cap in FIG. 8 illustrating sequentially the engagement of the tamper evident feature of the cap with a container neck.
Figure 10:
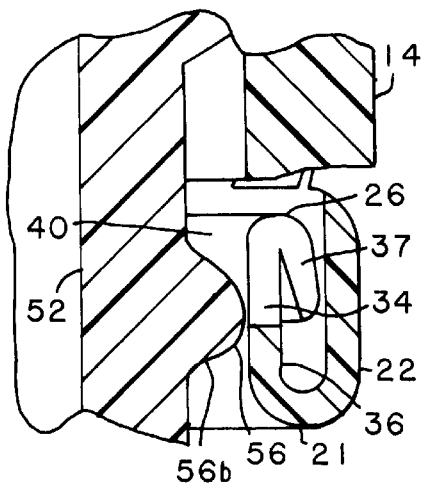

As further shown in the detail of FIGS. 9 and 10, as the tabs 40 of the inner wall section 24 complete their passage over the outside surface 56a of the lower locking ring 56, the tabs 40 reach a point where they are flexed outwardly to a maximum degree at the outermost section of the locking ring 56. The outwardly extending projection 37 may readily fold against the inner surface 22a of the outer wall 22, thereby contributing minimally to restraining the outward flexing of the tabs 40. The flexibility of tabs 40 are further controlled by their thickness and by the location of their attachment to the peripherally continuous portion 36 in relationship to the diameter of locking ring 56. After passage over the locking ring 56 upon continued application of the cap 10, the compressible and resilient tabs 40 are relaxed, and the curvilinear rim 26 of inner section 24 springs inwardly back along the horizontal underside 56b of the locking ring 56 to assume their original noncompressed shape and dimension where there are again urged against the bottle neck finish 52, as shown in FIG. 11, completing the capping operation, and substantially irreversibly securing the breakaway ring 20 to the bottle neck 52.

Figure 11:
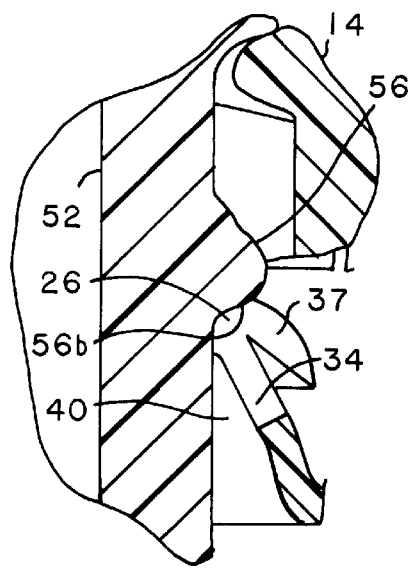
Figure 12:
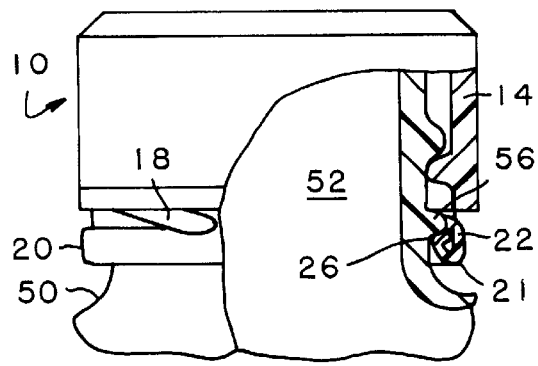
FIG. 12 is a longitudinal sectional view of the cap of FIG. 1 shown in partial cutaway illustrating the engagement of the cap and its tamper evident features with a container neck after completion of the sequence shown in FIGS. 9–11.

As is shown in FIGS. 11 and 12, after the cap 10 has been fitted and secured to the bottle neck 52 in the above-described manner, it can be seen that the curvilinear portion 26 of free end 30 is in abutment and nested in the transitional portion created by intersection of the horizontal underside surface 56b of locking ring 56, and the vertical neck finish 52, thereby providing an exceedingly tight and secure interference fit with the breakaway ring portion 20 and the container neck 52. The preferred radius for curvilinear rim 26 is equal to or less than the radius of transition between bottle neck 52 and the underside of bottle locking ring 56b. Without intending to limit the invention to theory, it is believed that the triangulated curl configuration of this preferred embodiment of the invention allows for such significant interference as the curvilinear connecting portion 21 provides a turn of tight radius which allows the band 20 both to resist uncurling and radial displacement thereof (discussed above) upon the application of stress to the band, and as the curvilinear rim portion 26 can be provided in a sufficiently tightly curled radius to engage the transition portion on the underside of container projecting ring 56b to insure continuous interfering contact between the breakaway band 20 and the portion of projection 56 of least diameter as the cap 10 is removed from the container prior to the band 20 separating, and remaining on the bottle neck. Additionally, concave surface 25 of the inner wall 24 of the triangulated curl provides a portion which has a predisposition to flex or collapse outwardly toward the outer wall section 22 upon the application of removal stress translated thereto by interference engagement, and in such a fashion which strengthens the inner section 24 on uncapping by resisting its inversion or uncurling and thereby insuring the continuous contact of the rim portion 26 with locking ring projection 56 and the contiguous bottle neck 52 to provide optimum interference upon cap removal. Further, rim projection 37 provides flexibility during capping, and can act as a radial reinforcing member.

Figure 13:
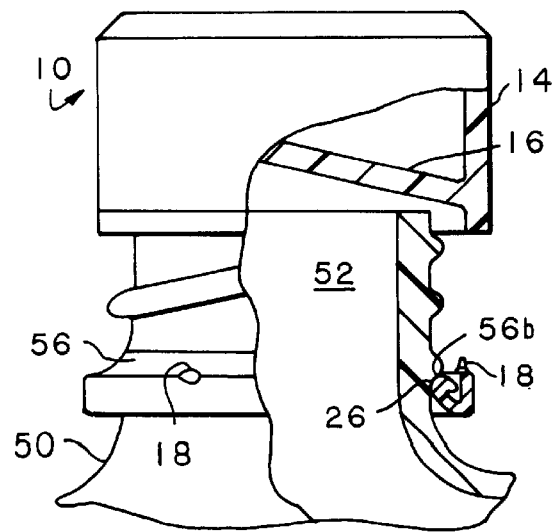
FIG. 13 is a longitudinal sectional view shown in partial cutaway illustrating removal of the cap shown in FIG. 12 from a container neck with the tamper evident band of the invention remaining on the container neck.

As further shown in FIG. 13, upon unthreading the cap 10 from bottle neck 52, the cap 10 will move in an upward axial direction in response to the unthreading torque applied. The tamper evident band, however, is blocked from such upward axial movement due to the interference of the resilient curvilinear rim 26 with the underside surface 56b of locking ring 56 such as described above. Upon continued application of unthreading torque to the cap 10, forces are applied which exceed the breaking strength of the frangible bridge sections 18 connecting the cap skirt 14 to the break-away ring 20, ultimately resulting in a fracture of the frangible portions 18. After fracture occurs, the tamper evident band 20 is secured by interference fit around the bottle neck finish 52, to insure that the band 20 will remain with the container or bottle as an opening or tamper evident feature. The cap 10 is then free to be removed from the bottle neck 52 for access to products contained in the bottle 50.

As will be readily appreciated from illustrations of the breakaway ring in FIGS. 1, 11 and 12, the tabs 40 having curvilinear rim 26 forming an interference fit do not extend to the curvilinear annular portion 21 connecting the outer section 22 to the inner section 24, but extend only to the boundary defined by the peripheral continuous intermediate section 36 which retains a substantially rigid inverted shape. As a result, such flexible tabs 40, which are now substantially hidden from view between the container neck finish 52 and the outer section 36 of the breakaway ring 20 are relatively inaccessible thereby thwarting attempted manipulation of the tabs 40 to maneuver the breakaway ring 20 over the locking ring 56 on the bottle neck 52 and to thus remove the breakaway ring 20 from the bottle neck 52 to thereby render useless the tamper evident features. Additionally the tabs 40 preferably abut and support each other circumferentially to collectively and individually resist movement inwardly and downwardly which serves to further thwart manipulation thereof. In the embodiment of the invention whereby the tabs 40 extend to the connecting portion 21 wherein there is no peripherally continuous portion 36 therebetween, their circumferential abutment serves additionally to provide support and stability to the array of tabs 40 prior to capping.

It is further contemplated in the present invention that cap 10 comprises a breakaway ring 20 which includes outer and inner annular wall sections 22 and 24 and having a cross sectional configuration in the form of a generally "J", "U", "V" or "trapazoidal" shape and each having a curvilinear connecting portion 21. In such contemplated embodiments of the invention, a preform cap 10a with breakaway band 50 can be reformed in the manner of the invention employing a respective tool such as reforming tool 320 which has working surface(s) suitable for shaping and dimensioning and otherwise reforming the free end 30 of cap preform 10a into the desired shape. Further, in such embodiments, the compressive stroke of the reforming tool is generally halted prior to contact with a lower surface 14a of skirt 14 or the surface of a separate reforming tool. A method suitable for forming such cross sectional configurations is described, for example, in U.S. Pat. No. 4,709,824, which is incorporated herein by reference. In such instances, a separate tool may be employed to provide a cap 10 comprising a breakaway ring 20 having a cross sectional configuration in the form of a generally "J", "U", "V", or "trapazoidal" shape and which further has a compressed rim 26 and/or an inwardly concave inner wall section 24 in the manner of the invention. It is also contemplated that such cross sectionally shaped breakaway rings have peripherally discontinuous portions in their respective inner wall sections 24, in the manner of the invention, or can be entirely peripherally continuous.

It is still further contemplated in the present invention that the cap 10 comprise a peripherally discontinuous portion 34 in free end 30 having at least one separation in the form of a slot, semicircular area, castellation, or undulation or other separating configuration, in place of or in addition to a slit configuration such as described hereinabove. Examples of a cap having such separating configurations is described, for example, in commonly assigned U.S. application Ser. No. 458,305, filed Dec. 28, 1989, now abandoned, and which is incorporated herein by reference.

The caps of the present invention can be used for a wide variety of containers and for a wide variety of products. Typically, cap sizes range from about 20 mm to 120 mm and bottle and/or jar sizes range from about 2 ounce to 128 ounce capacity.

Further, the caps of the present invention can include other features including metal lids, seals, etc. Specifically, the caps of the present invention can include the linerless seals disclosed in U.S. Pat. Nos. 4,708,255, 4,872,304, 4,793,506, 4,770,309 and the seals disclosed in U.S. patent application Ser. No. 060,218, all of which are assigned to the assignee of the present invention, and which the entire disclosure of each is hereby incorporated by reference.

Useful plastics which can be used for forming the caps of the invention include polypropylene, polyethylene, polystyrene, acrylonitrile-styrene-butadiene polymers, and other semi-rigid to rigid plastic materials.

The caps of the present invention can be used in combination with other materials (e.g., caps having metal lid portions or portions utilizing a different plastic than that used for the seal). Such caps may be used to close and seal a wide variety of containers for a wide variety of products including foods, beverages, household and other chemicals and other products requiring a tamper-indicating cap under the widest range of distribution and use conditions.

The invention in its broader aspects is not limited to the specific described embodiments and departures may be made therefrom within the scope of the accompanying claims without departing from the principles of the invention and without sacrificing its chief advantages.

We claim:

1. A method of forming a tamper evident cap for a container having a closure and projecting means thereon, comprising:

(a) forming a cap including an annular skirt with closure means for engaging the closure means on the container and a plastic band depending from and frangibly connected to the skirt, wherein the band has an upper section adjacent to the skirt and a lower section having a free end, (b) engaging said free end of said lower section with a substantially concave surface of a curling tool to curve said end, whereupon the upper section of the band becomes an outer section thereof and the lower section of the band becomes an inner section of the band, (c) then continuing to move the cap and tool relatively toward one another to bring said inner section at said free end into a restraining engagement with and between the lower end of the skirt and said tool surface to form a tightly radiused curvilinear rim in the portion of said inner section between and in contact with said tool surface and with the skirt and a projection in said inner section extending outwardly from said tightly radiused rim and in contact with said skirt, and (d) thereafter releasing the restraining engagement by the skirt and tool surface upon said rim portion of said inner section, to thereby provide a triangulated curled band having a tightly radiused curvilinear rim and a projection extending outwardly therefrom, wherein said tightly radiused rim is for engaging the projecting means on the container upon capping and initial removal of the cap from the container.

2. The method of claim 1, wherein said outer and inner sections of said band are connected by a curled portion and said inner section includes a curvilinear portion between said interconnecting curled portion and said tightly radiused rim.

3. The method of claim 1, wherein the second adjacent surface of the tool includes an inclined surface.

4. The method of claim 1, wherein the inner section of the band is formed with a discontinuous portion therein.

5. The method of claim 4, wherein the discontinuous portion is supported by said inner section.

6. The method of claim 4, comprising forming one or more tabs in the discontinuous portion of the inner section.

7. The method of claim 6, comprising forming tabs separated by areas having geometrical configurations selected from the group consisting of slits, slots, semicircular areas, castellation, undulations and combinations thereof.

8. The method of claim 1, comprising forming frangible means which include one or more fracturable bridges.

* * * * *